United States Patent [19]
Lee

[11] Patent Number: 5,805,221
[45] Date of Patent: Sep. 8, 1998

[54] VIDEO SIGNAL CODING SYSTEM EMPLOYING SEGMENTATION TECHNIQUE

[75] Inventor: Min-Sup Lee, Seoul, Rep. of Korea

[73] Assignee: Daewoo Electronics Co., Ltd., Seoul, Rep. of Korea

[21] Appl. No.: 550,331

[22] Filed: Oct. 30, 1995

[30]  Foreign Application Priority Data

Oct. 31, 1994  [KR]  Rep. of Korea ....................... 94-28261

[51] Int. Cl.⁶ ...................................................... H04N 7/26
[52] U.S. Cl. .......................................... 348/397; 382/243
[58] Field of Search .................................... 348/397, 399, 348/416, 426, 432; 382/173, 195, 190, 224, 225, 242, 243

[56]          References Cited

U.S. PATENT DOCUMENTS

| | | | |
|---|---|---|---|
| 5,079,630 | 1/1992 | Golin et al. .............................. | 348/399 |
| 5,113,256 | 5/1992 | Citta et al. ............................... | 348/397 |
| 5,161,205 | 11/1992 | Moran et al. ............................. | 382/56 |
| 5,459,513 | 10/1995 | Oddou ..................................... | 348/397 |
| 5,612,744 | 3/1997 | Lee et al. ................................. | 348/416 |

*Primary Examiner*—Victor R. Kostak
*Attorney, Agent, or Firm*—Pennie & Edmonds LLP

[57]            ABSTRACT

A video signal coding system employing a segmentation technique segments a video frame signal into regions to generate contour and texture information of each region and detects continuous boundaries located between adjacent regions. The contour and the texture information of each region and the boundary information of the continuous boundary are encoded to provide an encoded video signal. The video signal coding system calculates a mean value of pixels in two adjacent regions of each side of a continuous boundary and updates each pixel value within a predetermined distance from a continuous boundary with the mean value.

9 Claims, 2 Drawing Sheets

VIDEO SIGNAL CODING SYSTEM EMPLOYING SEGMENTATION TECHNIQUE

FIELD OF THE INVENTION

The present invention relates to a video signal coding system employing a segmentation technique; and, more particularly, to an improved video signal coding system which is capable of effectively improving the picture quality of an encoded video signal by removing or minimizing discontinuities between segmented regions.

DESCRIPTION OF THE PRIOR ART

In a digital video system such as video-telephone, teleconference or high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video codec (coding-decoding) systems as video-telephone and teleconference systems.

One of such methods for encoding video signals for a low bit-rate encoding system is the so-called segmentation-based coding technique.

In a first step of the segmentation-based coding technique, images are simplified in order to make it easier to segment them. In a next step called the feature extraction step, there are produced markers corresponding to the interior of homogeneous areas, i.e., segmented regions, of the simplified image. Once the markers have been obtained, the precise contours of the segmented regions detected at the feature extraction step can be found using an efficient morphological tool for segmentation called a watershed algorithm.

The contour and texture information of each segmented region is then coded. There are two types of information constituting the contour information: shape and location. The shape information refers to the form of each contour, whereas the location information deals with the position of each contour within the image. And as the texture information, a mean gray level of the pixels included in each segmented region is coded.

Since, however, in the conventional segmentation-based coding technique, each segmented region is represented by the mean gray level of the pixels therein, the encoded video signal may be discontinuous across the segmented regions even though the original video signal is continuous. Therefore, the picture quality of the encoded video signal may be sacrificed.

SUMMARY OF THE INVENTION

It is, therefore, a primary object of the invention to provide a video signal coding system employing a segmentation technique, which is capable of effectively improving the picture quality of the encoded video signal by removing or minimizing discontinuities between segmented regions.

In accordance with the present invention, there is provided an image processing system for processing a video signal including means for encoding an input video signal to provide an encoded video signal and means for decoding the encoded video signal to provide a reconstructed video signal, the input video signal including a plurality of video frames, wherein said encoding means comprises:

a segmentation block for segmenting each of the video frame signals into a plurality of regions to generate contour and texture information for each of the regions, wherein the contour information for each region represents the shape and location of said each region and the texture information for each region represents a first mean value of all the pixels contained in said each region;

a detection block for detecting, based on pixel values in the input video signal, a multiplicity of continuous boundaries among boundaries located between adjacent regions and providing boundary information representing the location of each of the continuous boundaries; and an encoding block for encoding the contour and the texture and the boundary information to provide the encoded video signal; and wherein said decoding means comprises:

a decoding block for decoding the encoded video signal to thereby provide the contour and the texture and the boundary information;

a reconstruction block for providing a reconstructed video frame signal based on the contour and the texture information for each of the regions;

a calculator for calculating a second mean value between the texture information of two adjacent regions of each side of the continuous boundary corresponding to the boundary information; and an update block for updating each of the pixel values within a predetermined distance from the continuous boundary with the second mean value.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
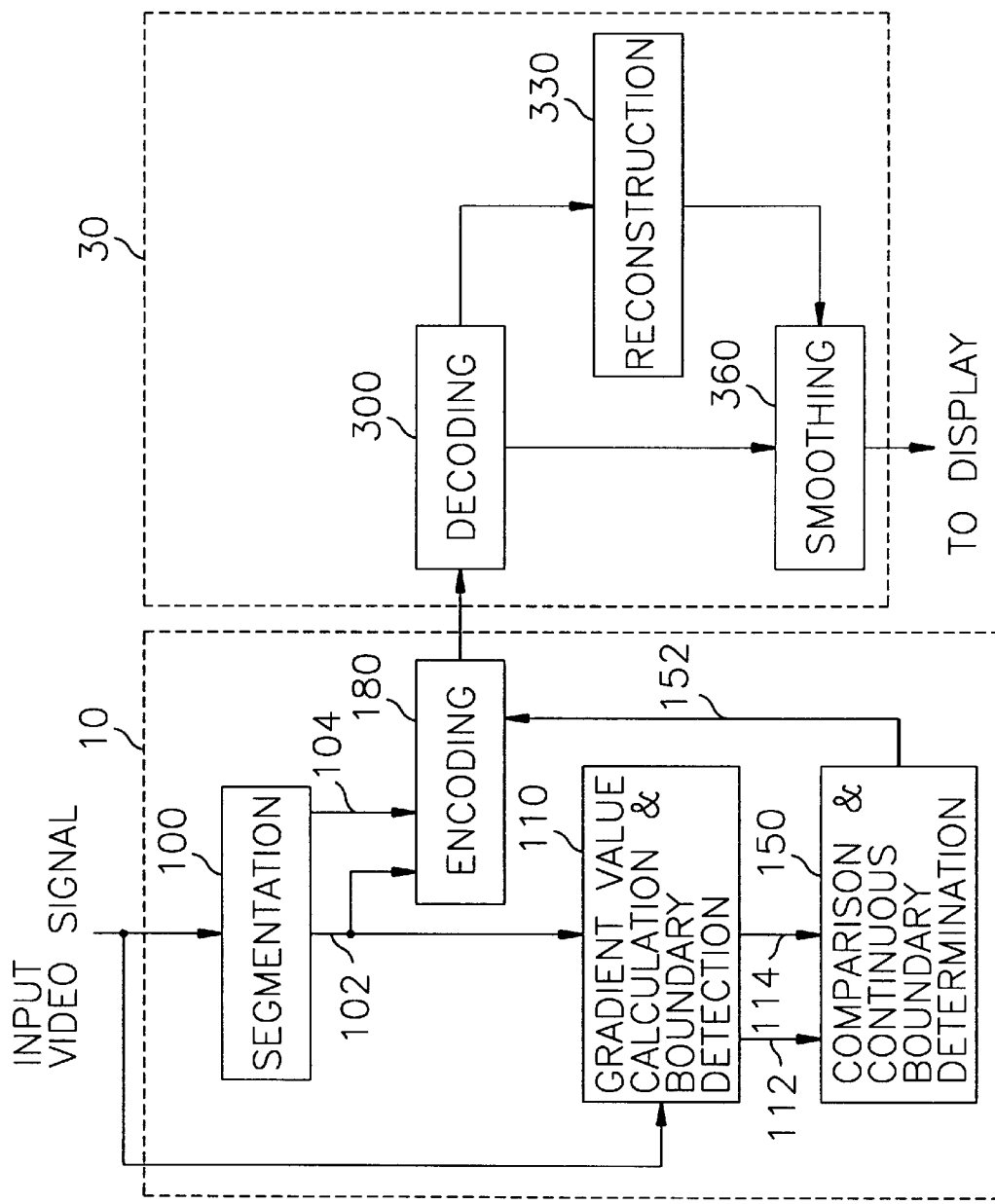
FIG. 1 represents a block diagram of the video signal coding system in accordance with the present invention.

Referring to FIG. 1, there is shown a block diagram of a video signal coding system in accordance with the present invention, wherein an input video signal includes a plurality of video frames. The video signal coding system includes a video signal encoder 10 and a video signal decoder 30.

The video signal encoder 10 is provided with a segmentation block 100, a gradient value calculation block 110, a comparison block 150 and an encoding block 180.

The input video signal is provided to the segmentation block 100 and the gradient value calculation block 110.

Figure 2:
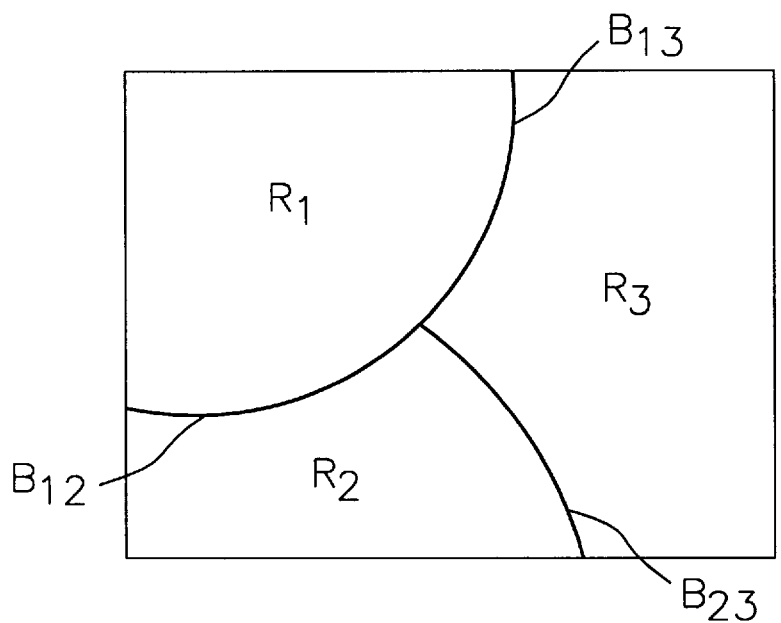
FIG. 2 shows segmented regions and boundaries between the segmented regions in the video frame signal.

The segmentation block 100 segments each of the video frame signals into a multiplicity of regions. In FIG. 2, the segmented regions(e.g., $R_1$ to $R_3$) in the video frame signal and boundaries (e.g., $B_{12}$ and $B_{23}$) between adjacent regions are shown exemplarily. As shown in FIG. 2, regions $R_1$, $R_2$ and $R_3$ are adjacent each other. The segmentation block 100 generates contour and texture information for each of the regions, wherein the contour 102 information 104 for each region represents the shape and location of each region and the texture information for each region represents a mean gray level value of all the pixels contained in each region.

The contour information of each region is provided to the gradient value calculation block 110 and the encoding block 180 and the texture information of each region is provided to the encoding block 180.

The gradient value calculation block 110 detects the boundaries(e.g., $B_{12}$ to $B_{23}$) based on the contour information fed from the segmentation block 100; and calculates the gradient values of the pixels of the input video signal within a predetermined width $\underline{W}$ from a boundary by using a conventional gradient operator, e.g., a sobel operator. For instance, directional gradients, e.g., horizontal and vertical gradients $G_x(x,y)$ and $G_y(x,y)$ at a pixel location(x,y) in the predetermined width $\underline{W}$, are calculated by using the horizontal and the vertical sobel operators; and a gradient value g(x,y) at the pixel location(x,y) may be obtained as:

$$g(x, y) = |G_x(x, y)| + |G_x(x, y)|$$

Then, the gradient value calculation block 110 calculates a mean gradient value of the pixels within a predetermined width $\underline{W}$ from a boundary by using the gradient values calculated as explained above. The mean gradient value 112 corresponding to each of the boundaries and boundary information 114 representing the location of each boundary are coupled to a comparison block 150.

If a mean gradient value of a boundary(e.g., $B_{12}$) is less than a predetermined threshold value TH, the comparison block 150 decides that the adjacent regions(e.g., $R_1$ and $R_2$) are continuous and selects the boundary(e.g., $B_{12}$) as a continuous boundary. The comparison block 150 provides, as additional information, the boundary information 152 for each of the continuous boundaries to the encoding block 180.

The encoding block 180 encodes the contour and the texture information of each region from the segmentation block 100 and the additional information from the comparison block 150 to provide an encoded video frame signal to a transmitter (not shown).

The encoded video signal transmitted via the transmitter (not shown) is provided to the video signal decoder 30 through a receiver(not shown). The video signal decoder 30 includes a decoding block 300, a reconstruction block 330 and a smoothing block 360.

First, the encoded video frame signal is fed to the decoding block 300 which serves to decode the encoded video frame signal to provide the contour and the texture information to the reconstruction block 330 and the additional information to the smoothing block 360.

Based on the contour and the texture information fed from the decoding block 300, the reconstruction block 330 generates a reconstructed video frame signal, which is then provided to the smoothing block 360.

In response to the additional information fed from the decoder 300, the smoothing block 360 performs a smoothing process with respect to each of the continuous boundaries as follows.

First, the smoothing block 360 receives the additional information from the decoding block 300 and the reconstructed video frame signal from the reconstruction block 330 and calculates a mean level between the texture information, i.e., two mean gray levels, of two adjacent regions(e.g., $R_1$ and $R_2$) of each side of the continuous boundary(e.g., $B_{12}$) corresponding to the additional information and updates the gray level of each pixel within a predetermined distance $\underline{D}$ from the continuous boundary (e.g., $B_{12}$) with the mean level calculated as shown above. Therefore, the texture information in two adjacent regions (e.g., $R_1$ and $R_2$) changes smoothly and becomes continuous. The smoothing block 360 provides an improved reconstructed video frame signal, wherein discontinuities between segmented regions are removed or minimized, to a display unit(not shown).

While the present invention has been described with respect to the particular embodiments, it will be apparent to those skilled in the art that various changes and modifications may be made without departing from the scope of the invention as defined in the following claims.

What is claimed is:

1. An image processing system having an encoder for providing an encoded video signal based on an input video signal and a decoder for providing a decoded video signal based on the encoded video signal, wherein the encoder comprises:

means for segmenting the input video signal into a plurality of regions to generate contour information and texture information, wherein the contour information represents the shape and location of said each of the regions and the respective texture information represents a mean pixel value of all the pixels contained in said each of the regions;

means for detecting boundaries between the regions based on the contour information for said each of the regions and calculating a mean gradient value of pixels within a predetermined width from each of the boundaries;

means for comparing the mean gradient value with a predetermined threshold value and, if the mean gradient value is less than the predetermined threshold value, determining a corresponding boundary as a continuous boundary to thereby provide boundary information representing the location of the continuous boundary; and means for encoding the contour information, the texture information, and the boundary information to provide the encoded video signal; and wherein the decoder comprises:

means for decoding the encoded video signal to thereby reproduce the contour information, the texture information and the boundary information;

means for providing a reconstructed video signal based on the contour information and the texture information; and means for determining a mean level between the texture information of two adjacent regions on each side of the continuous boundary corresponding to the boundary information, and updating each pixel value within a predetermined distance from the continuous boundary with the mean level to thereby provide the decoded video signal.

2. An image processing system for processing a video signal, having an encoder and a decoder, wherein the encoder comprises:

means for segmenting the video signal into a plurality of regions to generate contour information and texture information, wherein the contour information represents the shape and location of each of the regions and the texture information represents a mean pixel value of all the pixels contained in said each of the regions;

means for detecting boundaries between the regions based on the contour information and calculating a mean gradient value of pixels within a predetermined width from each of the boundaries;

means for determining continuous boundaries by comparing the mean gradient value of said each of the boundaries with a predetermined threshold value, to thereby provide boundary information representing locations of the boundaries determined as the continuous boundaries; and means for encoding the contour information, the texture information, and the boundary information to provide an encoded video signal; and wherein the decoder comprises:

means for decoding the encoded video signal to thereby reproduce the contour information, the texture information and the boundary information;

means for providing a reconstructed video signal based on the contour information and the texture information; and means for compensating differences between pixel values within a predetermined distance on each side from each of continuous boundaries based on the boundary information, the contour information and the reconstructed video signal, to thereby produce a decoded video signal.

3. The image processing system according to claim 2, wherein the encoder determines a boundary whose mean gradient value is less than the predetermined threshold value as the continuous boundary.

4. The image processing system according to claim 3, wherein the compensating means includes:

means for computing a mean level between the texture information of two adjacent regions on each side of said each of the continuous boundaries recognized by the boundary information; and means for updating each pixel value within the predetermined distance on each side from each of continuous boundaries with the mean level to thereby provide the decoded video signal.

5. A video signal encoder for encoding an input video signal to provide an encoded video signal, comprising:

means for segmenting the input video signal into a plurality of regions to generate contour information and texture information for each region, wherein the contour information represents a shape and a location of each region and the texture information represents a mean pixel value of all the pixels contained in that region;

means for detecting boundaries between the regions based on the contour information and calculating a mean gradient value of pixels within a predetermined width from each of the boundaries;

means for determining a boundary whose mean gradient value is less than a predetermined threshold value as a continuous boundary to thereby provide boundary information representing locations of the continuous boundaries; and means for encoding the contour information, the texture information, and the boundary information in order to produce the encoded video signal.

6. A video signal decoder for decoding an encoded video signal to provide a decoded video signal, comprising:

means for decoding the encoded video signal to thereby reproduce contour information, texture information and boundary information;

means for providing a reconstructed video signal based on the contour information and the texture information; and means for compensating differences between pixel values within a predetermined distance on each side from each of continuous boundaries corresponding to the boundary information based on the contour information and the reconstructed video signal, to thereby produce the decoded video signal.

7. The video signal decoder as recited in claim 6, wherein the compensating means includes:

means for computing a mean level between the texture information of two adjacent regions on each side of said each of the continuous boundaries; and means for updating each pixel value within said predetermined distance on each side from each of continuous boundaries with the mean level to thereby provide the decoded video signal.

8. An apparatus for encoding and decoding an image, said apparatus comprising:

an encoder comprising:

means for segmenting the image into a plurality of regions, each of said regions being represented by contour information comprising a shape and size of that region, and by texture information comprising a mean pixel value for all pixels within that region, each pair of adjoining regions being separated by a corresponding boundary;

means for calculating a mean gradient value for all pixels within a first predetermined distance from each of said boundaries in the image and comparing said mean gradient value to a predetermined threshold to provide continuous boundary information identifying at least one continuous boundary, said at least one continuous boundary requiring smoothing following reconstruction of said image; and means for encoding said contour information, texture information, and continuous boundary information; and a decoder comprising:

means for decoding said contour information, texture information, and continuous boundary information;

means for reconstructing a reconstructed image from said contour information and continuous boundary information; and means for smoothing said reconstructed image, said means for smoothing assigning to each pixel within a predetermined second distance from each of said continuous boundaries, a mean of the mean pixel values of said pair of regions corresponding to said each continuous boundary.

9. A method for encoding and decoding an image, said method comprising the steps of:

segmenting the image into a plurality of regions, each of said regions being represented by contour information comprising a shape and size of that region, and by texture information comprising a mean pixel value for all pixels within that region, each pair of adjoining regions being separated by a corresponding boundary;

calculating a mean gradient value for all pixels within a first predetermined distance from each of said boundaries in the image and comparing said mean gradient value to a predetermined threshold to provide continuous boundary information identifying at least one continuous boundary, said at least one continuous boundary requiring smoothing following reconstruction of said image; and encoding said contour information, texture information, and continuous boundary information; and subsequently decoding said contour information, texture information, and continuous boundary information;

reconstructing a reconstructed image from said contour information and continuous boundary information; and smoothing said reconstructed image by assigning to each pixel within a predetermined second distance from each of said continuous boundaries, a mean of the mean pixel values of said pair of regions corresponding to said each continuous boundary.

* * * * *